United States Patent [19]

Schlegel

[11] Patent Number: 4,659,578
[45] Date of Patent: Apr. 21, 1987

[54] METHOD OF STORING PERISHABLES SUCH AS MEAT

[75] Inventor: Jürgen Schlegel, Umkirch, Fed. Rep. of Germany

[73] Assignee: Vesten AG, Stans, Switzerland

[21] Appl. No.: 559,231

[22] Filed: Dec. 8, 1983

[30] Foreign Application Priority Data

Dec. 23, 1982 [DE] Fed. Rep. of Germany ... 8236195[U]
May 20, 1983 [EP] European Pat. Off. ........ 83105018.2

[51] Int. Cl.$^4$ .............................................. C12C 3/04
[52] U.S. Cl. .................... 426/418; 426/397; 426/513; 426/645; 17/32; 53/436
[58] Field of Search ...................... 17/32; 53/122, 436, 53/523, 526, 527; 100/910; 426/396, 397, 124, 129, 402, 411, 413, 414, 418, 478, 495, 513

[56] References Cited

U.S. PATENT DOCUMENTS

| | | | |
|---|---|---|---|
| 1,818,924 | 8/1931 | Basmadjian | 426/124 X |
| 2,528,276 | 10/1950 | Hoy | 100/910 X |
| 2,665,822 | 1/1954 | Crawford | 100/910 X |
| 3,017,822 | 1/1962 | Hawley | 100/910 X |
| 3,040,654 | 6/1962 | Opie | 100/910 X |
| 3,252,737 | 5/1966 | Seaton | 53/436 X |
| 3,580,409 | 5/1971 | Soboleski | 426/124 X |
| 3,646,881 | 3/1972 | Rathjen et al. | 100/910 X |
| 3,924,295 | 12/1975 | Ver Burg | 17/32 |

FOREIGN PATENT DOCUMENTS

| | | |
|---|---|---|
| 11479 | 11/1880 | Fed. Rep. of Germany . |
| 3106265 | 12/1984 | Fed. Rep. of Germany . |
| 370560 | 4/1932 | United Kingdom ................ 100/910 |
| 625673 | 9/1978 | U.S.S.R. ............................ 426/397 |

Primary Examiner—John Sipos
Assistant Examiner—Steven P. Weihrouch
Attorney, Agent, or Firm—Peter K. Kontler

[57] ABSTRACT

An arrangement for storing or preserving perishables such as meat has a vessel with an open upper end. The vessel may be provided with a cooling system. The vessel has a projecting rim and a U-shaped carrier is placed on top of the vessel upside down so as to engage the rim. The carrier supports a plunger which may be moved up-and-down inside the vessel and may be clamped in any position. A jack is releasably mounted on the carrier and operates to move the plunger down in the vessel. Perishables such as slabs of meat are placed in the vessel to form a stack therein. Air spaces in the stack are minimized by placing the perishables in full surface-to-surface contact with one another and with the walls of the vessel. A cover is placed on the stack and the plunger is lowered onto the cover. The jack is operated to move the plunger downward and thereby pressurize the stack. Sufficient pressure is applied to essentially eliminate any air spaces which remain in the stack and to squeeze a small amount of juice out of the perishables near the upper surface of the stack. The amount of juice is just sufficient to cover and thereby protect the upper surface of the stack. The sides and bottom of the stack are protected by the walls of the vessel. The plunger is clamped so that it continues to apply pressure to the stack and the jack is removed and used to pressurize perishables in another vessel.

3 Claims, 3 Drawing Figures

METHOD OF STORING PERISHABLES SUCH AS MEAT

BACKGROUND OF THE INVENTION

The invention relates generally to an arrangement for and a method of storing perishables such as meat.

More particularly, the invention relates to an arrangement for and a method of storing perishables such as meat under pressure.

A specific aspect of the invention relates to the storage of perishables such as meat under pressure employing a vessel which is provided with a cover. The perishables may be removed from the vessel as required.

Meat is conventionally stored by suspending it in a cooling chamber. However, a weight loss occurs within a relatively short period due to drying of the meat. The outer part of the meat, which is particularly susceptible to drying out, soon becomes inedible and must be removed before the meat is sold. This results in substantial losses.

It has therefore become known to pack meat in synthetic resin or vacuum packages which are then evacuated to obtain a specified vacuum. This, however, involves relatively substantial amounts of labor. Moreover, the materials which are constantly required to make the packages increase costs as does the apparatus required to seal the packages. In addition, there is the problem of deciding how much meat should be included in each package since the amount of meat to be consumed in the future is not known at the time of packaging.

It is further known to store meat in a vessel under pressure. In order to place the meat under pressure, a number of vessels are placed one on top of the other. The vessels have shaped edges which serve to connect the vessels with one another and also serve to limit the height to which the respective vessels can be filled.

In comparison to vacuum packages, for example, the storage of meat in such vessels is substantially improved as regards both cost and maximum possible storage time. However, it has been found in practice that difficulties arise when some of the meat is to be removed from the vessels. The reason is that the required pressure on the meat is achieved only when the vessels are filled to a specific height. After one or more pieces of meat have been removed from a vessel, the required pressure in the vessel can no longer be achieved and it is necessary to replace the pieces of meat which have been removed. Substitution of fresh meat for meat which has been removed cannot be performed satisfactorily in practice since it is then no longer possible to achieve the requisite storage time for the entire meat supply.

The effect to be achieved by pressurization, namely, good quality over prolonged storage periods, can only be achieved by filling the vessels precisely to a specified level and maintaining this level constant for the entire storage period. Accordingly, the storage of meat in pressurized vessels is to be employed in large businesses where the entire contents of a vessel can be disposed of at one time. While it is possible to extend the use of pressurized vessels to smaller businesses by employing smaller vessels, this leads to certain difficulties. Furthermore, the cost advantage over vacuum packing would be reduced, especially as regards the cost of material. In addition, a reduced vessel size would still not fulfill the practical requirements of a butcher shop of average size.

OBJECTS AND SUMMARY OF THE INVENTION

It is an object of the invention to provide an arrangement for storing or preserving perishables such as meat which makes it possible to remove some of the perishables from a vessel under pressure without deleterious effects on the remainder of the perishables in the vessel.

Another object of the invention is to provide an arrangement for storing or preserving perishables such as meat which makes it possible to maintain a desired pressure in a vessel even when some of the perishables are removed from the vessel.

An additional object of the invention is to provide an arrangement for storing or preserving perishables such as meat which makes it possible to maintain a desired pressure in a vessel regardless of the level to which the vessel is filled.

A further object of the invention is to provide an arrangement for storing or preserving perishables such as meat which makes it feasible to employ pressurized vessels for high-volume as well as low-volume businesses.

It is also an object of the invention to provide an arrangement for storing or preserving perishables such as meat which enables the perishables to be stored under pressure relatively economically.

Yet another object of the invention is to provide an arrangement for storing or preserving perishables such as meat which makes it possible to store a large quantity of perishables under pressure and to remove varying quantities of the perishables as required without losing the advantages of pressurization.

Still a further object of the invention is to provide a method of storing or preserving perishables such as meat which makes it possible to maintain the quality of the perishables over extended storage periods.

A concomitant object of the invention is to provide a method of storing or preserving perishables such as meat which enables the quality of the perishables to be maintained over extended periods even though some of the perishables are removed from time to time.

An additional object of the invention is to provide a method of storing or preserving perishables such as meat which enables the perishables to be stored in a relatively economical manner.

Another object of the invention is to provide a method of storing or preserving perishables such as meat which enables the quality of the perishables to be maintained over extended periods substantially independently of the amount of perishables present.

A further object of the invention is to provide a method of storing or preserving perishables such as meat which may be readily employed by high-volume as well as low-volume businesses.

The preceding objects, as well as others which will become apparent as the description proceeds, are achieved by the invention.

An arrangement according to the invention for storing or preserving perishables, particularly meat, comprises a vessel for accommodating the perishables. The arrangement also comprises a device for placing the perishables in the vessel under pressure. This device includes a member which is movable in the interior of the vessel and is designed to exert a compressive force on the perishables therein.

A cover may be provided for the perishables in the vessel.

Preferably, the pressurizing member is movable up-and-down in the vessel.

The pressurizing device makes it possible to achieve controlled pressurization even when the level to which the vessel is filled changes due to removal of some of the perishables from the vessel. Accordingly, it becomes possible to constantly remove any desired amount of perishables from a supply of the latter, e.g. a supply which at least approximates the quantity of perishables expected to be required over the storage period, with essentially no adverse effects on the remaining perishables. The movable pressurizing member permits the pressure to be adjusted with great precision.

One embodiment of the pressurizing device comprises a carrier for the pressurizing member and an adjusting mechanism for moving the pressurizing member. The pressurizing member may include a piston or pressure plate and the carrier may be designed to be releasably mounted on the vessel. Such a pressurizing device is relatively simple from a structural point of view and is capable of establishing a good connection with the vessel. Moreover, a pressurizing device of this type is well-suited for large vessels. In addition, the pressurizing member, which may act on the cover for the perishables, is easy to clean.

In accordance with another embodiment of the invention, the adjusting mechanism and the carrier with the pressurizing member are discrete components which are capable of being releasably connected with one another. This makes it possible to reduce costs when more than one vessel is employed since only one adjusting mechanism must be provided. This adjusting mechanism may be moved from one vessel to another as required.

In a further embodiment of the invention, the vessel is provided with cooling means. This eliminates any dependence on separate cooling chambers and permits the vessel to be placed right at the location, e.g. a selling counter, where the perishables are required.

Another aspect of the arrangement according to the invention comprises a vessel for accommodating perishables, pressurizing means for placing the perishables in the vessel under pressure and cooling means for the vessel.

The invention also provides a method of storing perishables, particularly meat, in which the perishables are confined to form a stack of the latter. The stack is pressurized in such a manner that juices are squeezed out of the perishables and substantially cover the upper surface of the stack. The perishables are stored under pressure with the juices substantially covering the upper surface of the stack.

Preferably, the pressurizing step is performed in such a manner that juices squeezed out of the perishables are present substantially only in the region of the upper surface of the stack.

Investigations have shown that meat may be particularly well-preserved over extended storage periods when pressurization of the meat is controlled in accordance with the invention. The amount of juice squeezed out of the meat may serve as an indicator to achieve the correct degree of pressurization.

According to one embodiment of the method, the perishables are placed in a vessel which is essentially entirely enclosed except for an inlet opening at the top. Pressure is then applied to the stack in the vessel from above.

The novel features which are considered as characteristic of the invention are set forth in particular in the appended claims. The improved storage arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
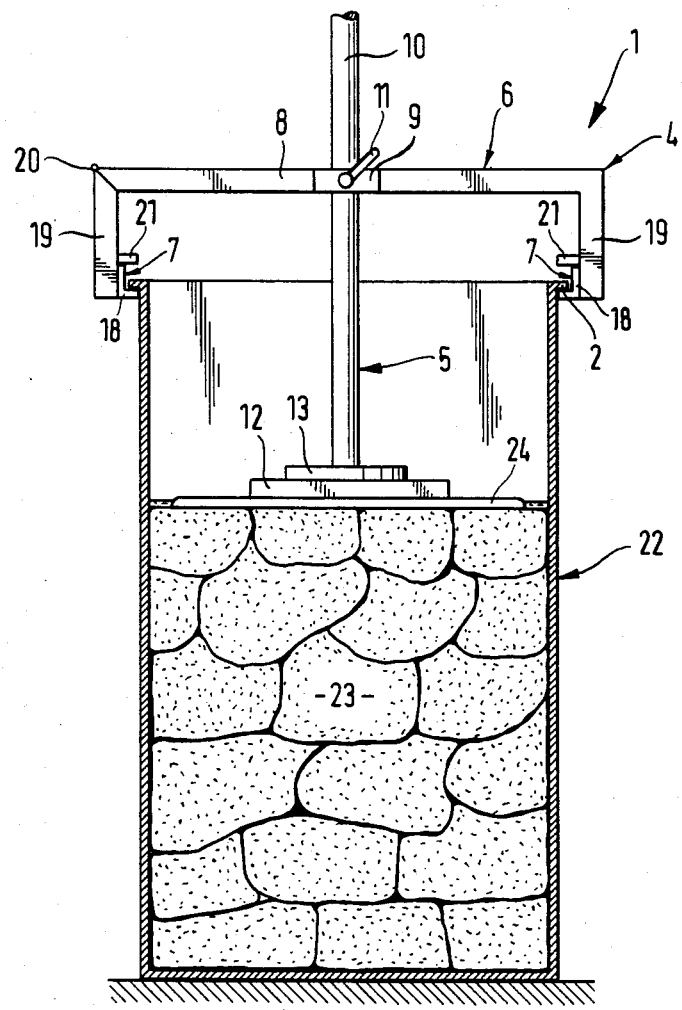
FIG. 1 is a schematic side view of a vessel and pressurizing device according to the invention.

FIG. 1 shows a vessel 22 for accommodating perishables under pressure. The perishables are here assumed to be in the form of slabs or pieces 23 of fresh raw meat. The vessel 22 has an open upper end via which the slabs 23 are placed in the vessel 22. The interior of the vessel 22 is entirely enclosed except at the open upper end of the vessel 22.

The slabs 23 form a stack or pile in the vessel 22. A cover 24 rests on the upper surface of the stack of slabs 23.

In accordance with the invention, a pressurizing device indicated generally at 1 is mounted on top of the vessel 22. The pressurizing device 1 presses down on the cover 24 and thereby exerts a compressive force on the slabs 23. The pressurizing device 1 functions to maintain the slabs 23 under pressure during storage of the slabs 23 in the vessel 22. In this regard, the vessel 22 is a storage vessel for storing or preserving the slabs 23.

Figure 2:
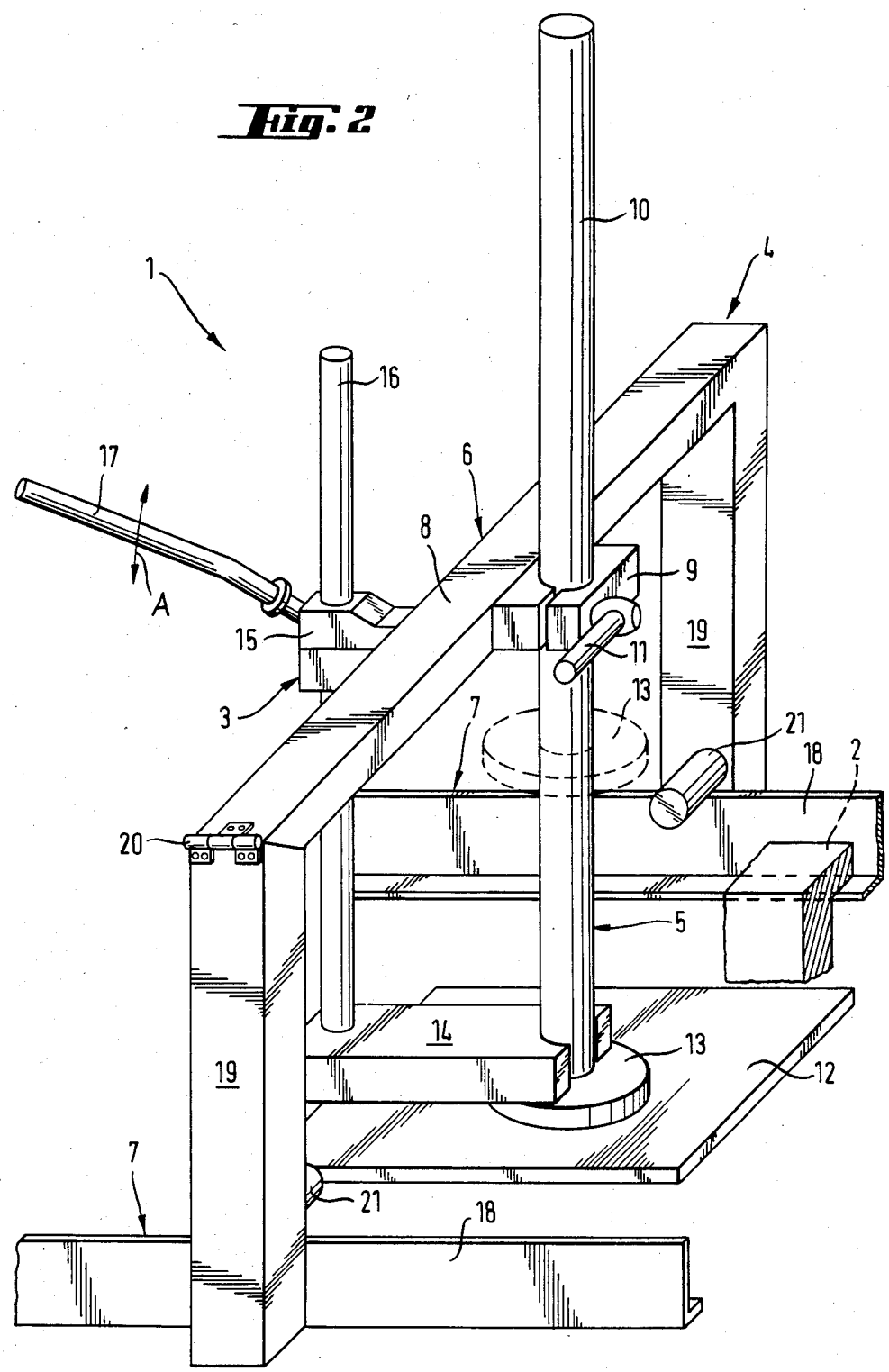
FIG. 2 is a perspective view illustrating details of the pressurizing device of FIG. 1.

FIG. 2 illustrates that the pressurizing device 1 includes a carrier 4 which supports a pressurizing member 5. The pressurizing member 5 is reciprocable in the carrier 4 and is designed to move up-and-down inside the vessel 22 when the pressurizing device 1 is mounted thereon. The pressurizing device 1 further comprises an adjusting or displacing mechanism 3 for moving the pressurizing member 5. The adjusting mechanism 3 and the carrier 4 with the pressurizing member 5 constitute two discrete structural units. The adjusting mechanism 3 may be readily connected with and disconnected from the carrier 4 via non-illustrated fastening means such as clamps or bolts. An advantage of making the adjusting mechanism 3 discrete structural unit is that a single adjusting mechanism 3 may then be used to pressurize a large number of vessels. This makes it unnecessary to provide a large number of adjusting mechanisms so that costs may be kept down. In FIG. 1, the adjusting mechanism 3 was removed after pressurizing the slabs 23 in the vessel 22.

Referring again to FIG. 2, it may be seen that the carrier 4 comprises a substantially U-shaped frame 6 having a pair of legs 19 which are connected by a web 8. A gripping element 7 is mounted at the free end of each of the legs 19. The function of the gripping elements 7 is to engage the vessel 22 so that the pressurizing device 1 is held on the vessel 22. In the illustrated embodiment, the gripping elements 7 comprise angle grippers 18, that is, the grippers 18 have substantially L-shaped cross sections. The vessel 22 has an outwardly projecting rim 2 and the short, horizontal sides of the grippers 18 are located below the rim 2 when the pressurizing device 1 is mounted on the vessel 22.

The vessel 22 is here assumed to be square or rectangular so that the rim 2 may be considered to include several sections each of which extends along one side of the vessel 22. The grippers 18 are designed to engage respective sections of the rim 2 which are located on opposite sides of the vessel 22 and are parallel to one another.

A guide 9 which also functions as a clamp is mounted approximately at the center of the web 8 connecting the legs 19 of the frame 6. The guide 9 has an opening of variable cross-sectional area. A clamping a securing element 11 is mounted on the guide 9 and may comprise a clamping screw.

The pressurizing member 5 comprises a guide rod or holder 10 which is received in the opening of the guide 9. The guide rod 10 is slidable up-and-down in the guide 9 when the clamping element 11 is loosened and may be fixed in any desired position by tightening the clamping element 11.

A pressure applying plate or piston 12 is mounted at the lower end of the guide rod 10. The upper surface of the pressure plate 12 carries an abutment 13 which is designed to be engaged by the adjusting mechanism 3. As indicated by phantom lines, one or more additional abutments 13 may be mounted on the guide rod 10 at a distance from the pressure plate 12. The provision of one or more additional abutments 13 may be of advantage when the maximum stroke of the pressurizing member 5 exceeds the maximum stroke of the adjusting mechanism 3.

The pressure plate 12 is designed to be pushed against the cover 24 in the vessel 22 by the adjusting mechanism 3. The resulting pressurization of the slabs 23 in the vessel 22 may cause juices to be squeezed out of the slabs 23. Generally, downward displacement of the pressure plate 12 will be limited in such a manner that the pressure plate 12 does not contact these juices or is immersed in the juices only to a very slight extent. In any event, the design of the pressure plate 12 is such that it may be readily cleaned.

As illustrated in FIG. 2, the adjusting mechanism 3 is advantageously in the form of a jack such as is used for jacking up cars. The adjusting mechanism 3 includes a mounting element 15 which is designed to be releasably connected with the frame 6 of the carrier 4. In the present case, the mounting element 15 is arranged to be secured to the web 8 of the frame 6. The adjusting mechanism 3 further includes a shifting element or foot 14 which is designed to engage one of the abutments 13 on the pressurizing member 5. An adjusting rod 16 is fast with the shifting element 14 and is slidably mounted in the mounting element 15 for up-and-down movement. A lever 17 is provided to effect movement of the adjusting rod 16 relative to the mounting element 15. Upon actuation of the lever 17 in the manner indicated by the double-headed arrow A, the adjusting rod 16, and hence the shifting element 14, are displaced downwards relative to the frame 6 so that the shifting element 14 comes to bear against an abutment 13. Continued actuation of the lever 17 then causes the shifting element 14 to push the pressure plate 12 downwards relative to the frame 6.

The shapes of the gripping elements 7 preferably correspond to the shape of the vessel 22 and the peripheral configuration of the rim 2. Similarly, it is preferred for the dimensions of the gripping elements 7 to approximate or equal the corresponding dimensions of the vessel 22 and the rim 2. The gripping elements 7 may be fixed relative to one another in which case the distance between the gripping elements 7 is somewhat less than the distance between the sections of the rim 2 which are engaged by the gripping elements 7. The pressurizing device 1 must then be mounted on the vessel 22 by moving the pressurizing device 1 towards the vessel 22 from the side.

It is further possible for the gripping elements 7 to be movable towards and away from one another. This may be accomplished, for example, by designing the web 8 as a telescoping device and providing locking means for locking the web 8 in any of a plurality of telescoped positions. On the one hand, this makes it possible to conform the pressurizing device 1 to vessels of different dimensions. On the other hand, this makes it possible to mount the pressurizing device 1 on the vessel 22 from above. Thus, when the pressurizing device 1 is to be mounted on the vessel 22, the gripping elements 7 are moved away from one another to such an extent that they clear the rim 2 as the pressurizing device 1 is moved downwards towards the vessel 22. Once the gripping elements 7 have passed by the rim 2, the gripping elements 7 are moved towards one another until the distance between them is smaller than the distance between the corresponding sections of the rim 2. The gripping elements 7 are now able to engage the rim 2 from below.

As shown in FIG. 2, it is further possible to connect one or both legs 19 of the frame 6 to the web 8 by means of a hinge 20. The longitudinal axis of the hinge 20, which constitutes a pivot axis, is parallel to the longitudinal axes of the gripping elements 7 and hence to the sections of the rim 2 engaged by the gripping elements 7. The hinge 20 permits the corresponding leg 19 to be pivoted towards and away from the other leg 19. This again makes it possible to mount the pressurizing device 1 on the vessel 22 from above. Thus, when the pressurizing device 1 is to be mounted on the vessel 22, at least one of the legs 19 is pivoted away from the other until the clearance between the gripping elements 7 is greater than the distance between the sections of the rim 2 to be engaged by the gripping elements 7. Once the gripping elements 7 have passed by the rim 2, the legs 19 are returned to the position of FIG. 2 so that the gripping elements 7 may engage the rim 2 from below.

A roller 21 is mounted on each of the legs 19 above the respective gripping element 7. Each of the rollers 21 defines a gap with the corresponding gripping element 7 and the rim 2 of the vessel 22 is received in the gaps between the rollers 21 and the gripping elements 7. The rollers 21 prevent the pressurizing device 1 from dropping off the vessel 22 after the pressurizing device 1 has been mounted on the vessel 22 but before the adjusting mechanism 3 has been connected to the frame 6 and/or before the clamping element 11 has been tightened. In operation, the slabs 23 of meat are placed in the vessel 22 so as to form a stack of the slabs 23 therein. The cover 24 is then placed on top of the stack. The pressurizing device 1, with or without the adjusting mechanism 3, is now mounted on the vessel 22 so that the rim 2 is confined between the rollers 21 and the gripping elements 7. The adjusting mechanism 3 is connected to the frame 6 if this was not done prior to mounting of the pressurizing device 1 on the vessel 22.

The clamping element 11 is loosened so that the guide rod 10 of the pressurizing member 5 is free to move in the guide 9. The lever 17 is manipulated in the manner indicated by the double-headed arrow A so that the shifting element 14 is brought to bear against an abutment 13 on the pressurizing member 5. Manipulation of the lever 17 is continued thereby causing the shifting element 14 to press the pressure plate 12 against the cover 24. This results in pressurization of the stack of slabs 23. When the pressure on the slabs 23 is sufficiently high, the clamping element 11 is tightened thereby fixing the pressure plate 12 in position. The adjusting mechanism 3 may now be removed if desired and used to pressurize another vessel.

Since the pressure plate 12 is fixed in position, the slabs 23 remain under pressure. The vessel 22 serves to store or preserve the slabs 23 until these are required. One or more of the slabs 23 may be withdrawn from the vessel 22 at any time by loosening the clamping element 11 so that the cover 24 may be removed. After the desired number of slabs 23 has been withdrawn from the vessel 22, the slabs 23 remaining in the vessel 22 may be pressurized once more by again mounting the adjusting mechanism 3 on the frame 6.

The pressurizing device 1 makes it possible to obtain controlled pressurization of the slabs 23 regardless of the level to which the vessel 22 is filled. Proper pressurization is important to both the quality of the meat and the length of time for which the meat can be stored. If the pressure is too great, an excessive amount of juice will be forced out of the meat thereby causing weight loss as well as a reduction in quality. On the other hand, the pressure should not be too low since, according to the invention, the stack of slabs 23 is preferably essentially free of internal voids when the vessel 22 is used for the storage of boned meat. In other words, the individual slabs 23 of the stack preferably lie against one another in such a manner that virtually no gaps exist between neighboring slabs 23.

In order to minimize the number of voids in the stack of slabs 23, care should be exercised in placing the slabs 23 in the vessel 22. The slabs 23 should be placed in the vessel 22 in such a manner that the number of air spaces between neighboring slabs 23 is minimized, that is, each of the slabs 23 should be in virtually complete surface-to-surface contact with all neighboring slabs 23. Any air spaces which may be present in the stack after the slabs 23 have been placed in the vessel 22 are at least partly eliminated by the weight of the slabs 23. Residual air spaces which are not eliminated by the weight of the slabs 23 should be at least largely eliminated by the pressurizing device 1. The pressurizing device 1 is particularly effective in eliminating air spaces or voids in the upper part of the stack where the weight of the slabs 23 is not as great as in the lower part of the stack.

It is further preferred for the interface between the vessel 22 and the stack of slabs 23 to be substantially free of voids or air spaces. In other words, the slabs 23 adjacent to the walls of the vessel 22 are preferably in virtually complete surface-to-surface contact with the walls of the vessel 22.

By storing the slabs 23 in substantially complete surface-to-surface contact with practically no air spaces between neighboring slabs 23, the stack of slabs 23 may, for all practical purposes, be considered to constitute a single piece of meat. The bottom and sides of the stack are protected by the walls of the vessel 22. In order to protect the upper surface of the stack, the latter is compressed to such an extent by the pressurizing device 1 that juices are squeezed out of the meat in the region of the upper surface of the stack and form a protective layer on the upper surface.

Inasmuch as the stack essentially constitutes a single piece of meat which is virtually free of voids internally as well as at the interface with the vessel 22, the individual slabs 23 do not lie in their own juices. The pressure exerted by the pressurizing device 1 actually prevents the bottom and sides of the stack from being wetted by the juices of the meat and enables the bottom and sides of the stack to remain virtually dry during storage. Juices from the meat are present essentially only in the region of the upper surface of the stack where these juices form a protective layer on the stack.

As already indicated, the pressurization achieved by the pressurizing device 1 causes the slabs 23 to form a single piece of meat for all practical purposes. This makes it possible to lengthen the period for which the slabs 23 are stored. However, in spite of the fact that these slabs 23 act as a single piece of meat as far as the ability to be stored is concerned, it is nevertheless possible to readily withdraw individual slabs 23 from the vessel 22 as required by temporarily relieving the pressure. The slabs 23 remaining in the vessel 22 may subsequently be pressurized once more so as to again act like a single piece of meat.

It has been found that the slabs 23 at the bottom of the stack may be stored for the longest periods of time. This is at least partly due to the fact that the lowermost slabs 23 are the ones which are best protected from the surroundings. The extended storage capability of the lowermost slabs 23 is of considerable advantage since individual slabs 23 to be withdrawn from the vessel 22 are removed from the top of the stack. Furthermore, it provides greater flexibility in adjusting the storage time relative to the expected rate of removal of the slabs 23 from the vessel 22.

Storage of the slabs 23 under pressure and substantially in the absence of voids provides the advantage that the slabs 23 may be stored compactly. This reduces the amount of storage space required and thus enables storage costs to be markedly reduced.

Figure 3:
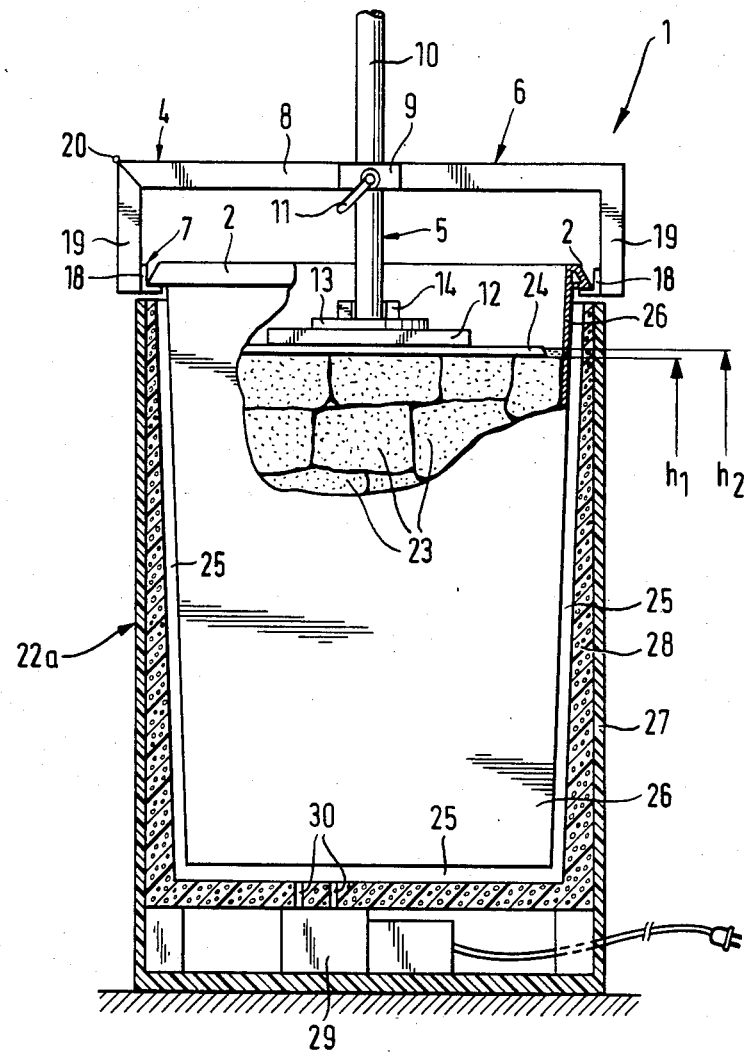
FIG. 3 is an enlarged view similar to that of FIG. 1 but showing another embodiment of the vessel.

Referring now to FIG. 3, the same reference numerals as in FIGS. 1 and 2 have been used to identify like elements. FIG. 3 illustrates a storage vessel 22a which, in contrast to the vessel 22, is provided with cooling means.

The vessel 22a is normally stored in a cooling chamber during storage of the slabs 23. Such a cooling chamber may, for example, have a temperature of 2° C. The slabs 23 are removed from the vessel 22 and the cooling chamber as required and, if necessary, are temporarily stored in the selling area of the store. The cooling means of the vessel 22a makes it possible to install the vessel 22a directly in the selling area. Among other things, this improves access to the slabs 23. Furthermore, the cooled vessel 22a makes a separate cooling chamber unnecessary.

The vessel 22a is double-walled and includes an inner wall 26 and an outer wall 27. The inner wall 26 and the outer wall 27 are located at a distance from one another and cooperate to define a space. A conduit 25 for a cooling fluid is disposed adjacent to the inner wall 26 in the space between the walls 26 and 27, i.e. the conduit 25 is disposed adjacent to that surface of the inner wall 26 which faces away from the interior of the vessel 22a. The conduit 25 may, for example, be in the form of a cooling coil. Thermal insulation 28 is disposed between the conduit 25 and the outer wall 27.

The inner wall 26 is advantageously composed of stainless steel but good results are also obtained if the inner wall 26 is composed of a synthetic resin. The outer wall 27 is, as a rule, composed of a synthetic resin.

The design of the vessel 22a makes it possible to achieve good heat transfer between the interior of the vessel 22a and the cooling fluid in the conduit 25. Thus, as mentioned previously, the conduit 25 is disposed immediately adjacent to the inner wall 26. On the other hand, the thermal insulation 28 and the outer wall 27 of synthetic resin form a thermal barrier which reduces heat transfer between the conduit 25 and the surroundings. It is to be mentioned that the presence of the thermal insulation 28 is advantageous but that the thermal insulation 28 could be omitted.

A conventional refrigerating system 29 is located at the bottom of the vessel 22a. The refrigerating system 29 removes heat from the cooling fluid which has circulated through the conduit 25 and has thus become heated and returns the cooled fluid to the conduit 25. The refrigerating system 29 communicates with the conduit 25 via pipes 30.

The refrigerating system 29 may be situated at locations other than the bottom of the vessel 22a. For instance, the refrigerating system 29 may be disposed at the rear of the vessel 22a.

As clearly seen in FIG. 3, the interior of the vessel 22a which accommodates the slabs 23 has a frustoconical cross section. The arrangement is such that the cross-sectional area of the interior of the vessel 22a decreases in a direction from the top to the bottom of the vessel 22a. By virtue of this design, a certain amount of pressure is already applied to the slabs 23 from the sides when the slabs 23 are placed in the vessel 22a. This contributes to the elimination of voids or air spaces between neighboring slabs 23.

As mentioned previously, the pressurizing device 1 preferably exerts so much pressure on the stack of slabs 23 that juices are squeezed out of the slabs 23 in the region of the upper surface of the stack and form a protective layer on the upper surface. FIG. 3 illustrates that only a small amount of the juices need be squeezed out of the slabs 23 and, in particular, just enough to cover the upper surface of the stack. In FIG. 3, h1 identifes the level of the upper surface of the stack while h2 identifies the upper surface of the layer of juice on the stack. It will be observed that the level h2 is below the level of the upper surface of the cover 24. The juices constituting the relatively thin layer on top of the stack are virtually the only juices in contact with the stack. If the slabs 23 are carefully placed in the vessel 22a so that neighboring slabs 23 are in substantially full surface-to-surface contact and the slabs 23 adjacent to the inner wall 26 are in substantially full surface-to-surface contact with the inner wall 26, the pressure exerted on the stack may be kept relatively low since essentially no voids or air spaces are present to begin with.

The vessels 22, 22a preferably have rectangular cross sections. The vessels 22, 22a may, for example, have a length of about 93 centimeters and a width of about 57 centimeters. The height of the vessels 22, 22a may be of the order of 83 centimeters. It is also possible to provide vessels 22, 22a having two of the dimensions indicated above while either the length or width is approximately one-half of the preceding length and width. For example, the vessels 22, 22a may have a length of about 57 centimeters and a width of about 46 centimeters rather than a length of about 93 centimeters and a width of about 57 centimeters. By halving the length or width of at least some vessels 22, 22a, it becomes possible to install vessels 22, 22a having different capacities next to one another in a compact manner.

It is preferred for the vessels 22, 22a to have rectangular cross sections since this enables several vessels 22, 22a to be installed next to one another compactly. Nevertheless, it is possible for the vessels 22, 22a to have other polygonal configurations. Similarly, the vessels 22, 22a may be circular or may have other rounded configurations.

The vessels 22, 22a are advantageously designed to have capacities of 80 kilograms, 150 kilograms and 300 kilograms.

At least those portions of the arrangement which come into contact with the slabs 23 should be composed of a material which is substantially chemically inert with respect to the slabs 23. Stainless steel is advantageously used for such portions of the arrangement. However, these portions of the arrangement may also be composed of a synthetic resin. If a synthetic resin is employed, it is particularly favorable to use a fiberglass-reinforced synthetic resin.

Investigations have demonstrated that the method and arrangement of the invention permit the storage period for boned, fresh raw meat to be increased approximately three-fold as compared to conventional storage techniques, i.e. as compared to vacuum packaging and suspending the meat in cooling chambers. It was found that, when using the teachings of the invention, pork still had completely satisfactory characteristics and no detectable loss in quality after three weeks of storage; veal still had completely satisfactory characteristics and no detectable loss of quality after four weeks of storage; and beef still had completely satisfactory characteristics and no detectable loss in quality after six weeks of storage. It was also found that meat having a high pH, that is so-called DFD or PSE meat, can be satisfactorily stored by means of the invention for a substantially longer period than in a vacuum package. Furthermore, when DFD meat was placed in a stack with other meat for storage in accordance with the invention, a certain amount of regeneration of the DFD or PSE meat took place. The abbreviation "DFD" denotes dark-firm-dry (for beef), and the abbreviation "PSE" denotes pale-soft-exudative (for pork).

The following are among the advantages which may be achieved by employing the techniques of the invention to store meat, that is, by storing meat under pressure in containers with neighboring slabs of meat in substantially full surface-to-surface contact:
1. Substantially increased storage periods.
2. Less weight loss.
3. Better meat color even after extended storage periods.
4. No development of a sour taste.
5. Accelerated attainment of the desired degree of aging.
6. Reliable aging of the meat with only small losses.

Additionally it is possible to realize the vessel as a standardized container e.g. for a ship-transport.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of storing pieces of fresh meat, comprising the steps of confining the pieces of fresh meat in an open-top vessel so as to form a stack of neighboring pieces; placing into the vessel a cover to overlie the stack of neighboring pieces and applying pressure to the cover to pressurize the stack in the vessel to such an extent (a) that juices are squeezed out of the pieces and rise above the stack and (b) that voids between the neighboring pieces as well as between the vessel and the stack are eliminated; and storing the pieces in the vessel under pressure without requiring refrigeration for a period of up to several weeks by applying pressure to said cover or a separate cover to bear against the neighboring pieces of the stack so as to prevent the development of voids.

2. A method as defined in claim 1, wherein the confining and pressure applying steps are performed in such a manner that juices are present essentially only at the top of the stock.

3. A method as defined in claim 1, wherein the confining step comprises enclosing the stock in the vessel except from above.

* * * * *